F. L. SLIFE.
WELDING APPARATUS.
APPLICATION FILED MAR. 22, 1919.
1,414,530.
Patented May 2, 1922.
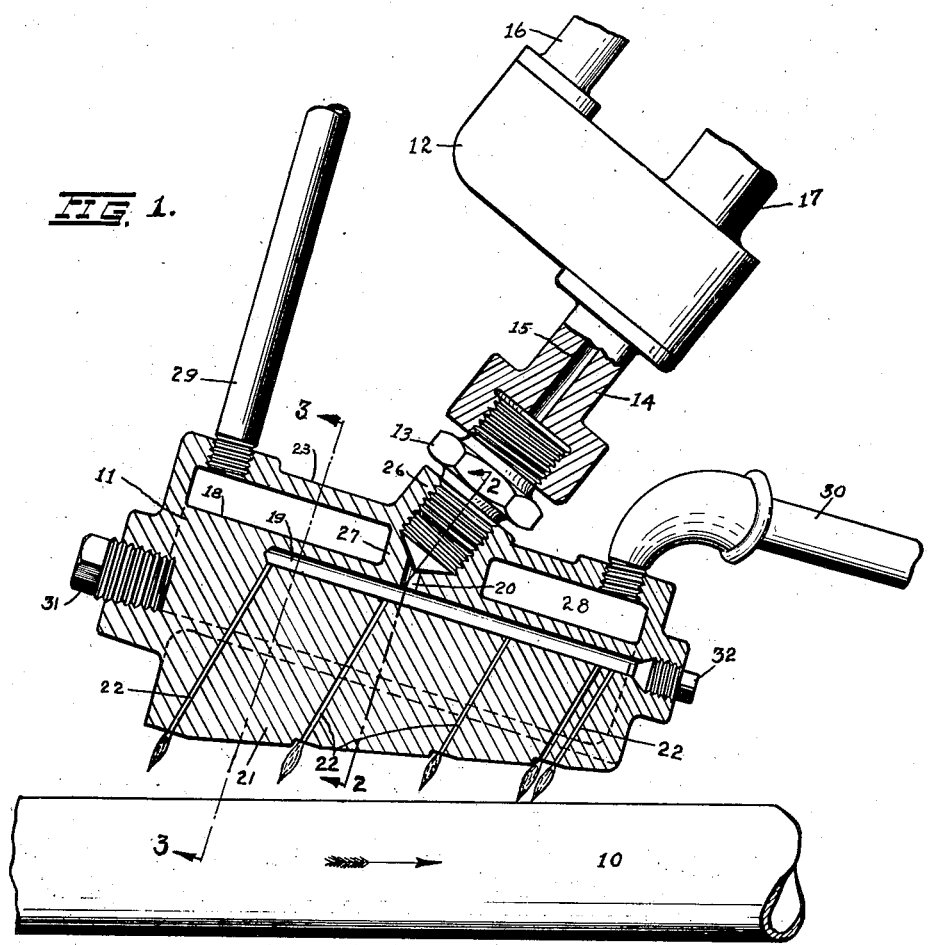
FIG. 1.
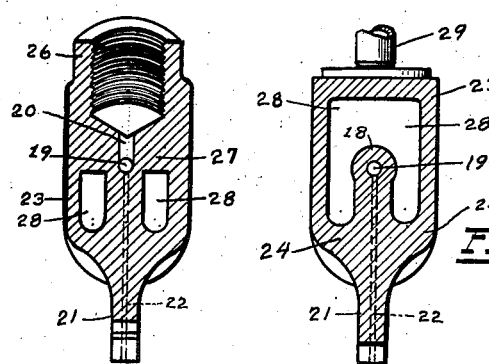
FIG. 2.
FIG. 3.
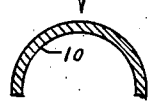
Inventor
FRANK L. SLIFE.
By
Attorney

UNITED STATES PATENT OFFICE.

FRANK L. SLIFE, OF CLEVELAND, OHIO, ASSIGNOR TO THE ELYRIA IRON & STEEL COMPANY, OF CLEVELAND, OHIO, A CORPORATION OF OHIO.

WELDING APPARATUS.

1,414,530.  Specification of Letters Patent.  Patented May 2, 1922.

Application filed March 22, 1919. Serial No. 284,407.

*To all whom it may concern:*

Be it known that I, FRANK L. SLIFE, a citizen of the United States, and a resident of Cleveland, county of Cuyahoga, State of Ohio, have invented certain new and useful Improvements in Welding Apparatus, of which the following is a specification.

This invention relates to apparatus for use in gas welding processes and more particularly to torch tips.

It is one of the objects of the invention to provide a tip that will be efficient in operation and simple and comparatively inexpensive to manufacture. Another object of the invention is to provide a tip which may be water cooled and which may nevertheless, be readily connected to and disconnected from the apparatus associated therewith.

One form of the invention is illustrated in the accompanying drawings of which:

Figure 1 is the longitudinal section through the torch tip embodying the invention;

Figure 2 is a section on the line 2—2 of Figure 1; and

Figure 3 is a section on the line 3—3 of Figure 1.

The invention is particularly applicable to machines for welding the seam in tubing, an example of such machine being shown in the Lloyd Patent No. 1,124,763 of January 12, 1915. In the drawings the tube to be welded is indicated at 10 and the torch tip is indicated generally by the numeral 11 and is supported from a head block 12 by means of a connection 13. The head block carries an extension 14, to which the connection 13 is secured, and may be of any preferred construction embodying a mixing chamber 15 supplied with gases in the ordinary manner as by means of the connections 16 and 17.

The torch tip consists of an internal barrel 18 having a longitudinal bore or gas chamber 19 which is supplied from the connection 13 by means of the passage 20. A fin 21 projects from one side of the barrel 18 and has a plurality of lateral passages 22 on the opposite side of said chamber 19 from the passage 20, which are supplied from the chamber 19. A casing or jacket 23 surrounds the barrel 18 and is formed integral with the opposite sides of the fin 21 at the points 24 and 25. There is a threaded boss 26 on the casing 23 in which the connection 13 is secured, and a bridge 27 extends from the boss 26 to the barrel 18 and has arranged therein the passage 20.

The jacket 23 provides a chamber 28 around the barrel 18, for a cooling medium which may be conducted to and from the chamber by means of the pipes 29 and 30, which are preferably connected with the tip on the side opposite the outlets from the passages 20 so as to be protected from the heat by the body of the tip.

The tip is preferably formed as a one-piece casting and the chamber 28 can be cored out, openings formed in the casting by the supporting means for the core, being subsequently closed by the plug 31. The gas chamber 19 is preferably formed by drilling through the barrel 18 and the outer end of the opening thus formed is closed by means of a plug 32. The lateral passages 22 are also preferably formed by drilling through the fin 22, and may be of any desired diameter to meet the conditions for which the torch is to be used.

In the operation of the device the tube 10 is preferably moved along under the tip, as indicated by the arrow in Figure 1, and the welding flames will be directed from the passages 22 against the tube.

From the foregoing description and the drawings, it will be apparent that I have provided a cooled tip which is supplied with a cooling medium directly from the pipes 29 and 30, and entirely independent of the supporting means for the tip. By this arrangement the efficiency of the apparatus is greatly improved and the head block and mixing chamber do not receive the heat from the tip that they usually do in the constructions heretofore used, and on this account the gas may be delivered to the jets in proper condition for producing the best effects.

While I have illustrated and described what I now consider to be the preferred form of my invention, it is understood that various changes may be made in the details of the construction without departing from the spirit of the invention which is defined in the appended claims.

Having thus described my invention, what I claim is:

1. In apparatus of the class described, the combination with a supporting member having a gas mixing chamber, a plurality of gas supply connections and an outlet from the mixing chamber, of a jacketed tip detachably connected with said member and receiving gas from said outlet, and means, independent of said member, for conducting a cooling medium to and from the jacket of said tip.

2. In apparatus of the class described, the combination with a supporting member having a gas mixing chamber, a plurality of gas supply connections and an outlet from the mixing chamber, of a relatively long and narrow tip connected with said member and receiving gas from said outlet, said tip having walls forming a longitudinal main gas passage with a plurality of lateral passages communicating therewith, and a chamber for a cooling medium around said main gas passage, and means connected directly to the tip for conducting a cooling medium to and from said last-named chamber.

3. In apparatus of the class described, the combination of a head block having a mixing chamber therein, a jacketed tip detachably connected therewith, and means independent of said head block for conducting a cooling medium directly to and from said tip.

4. A torch tip comprising a barrel having a bore, a fin projecting from the barrel and extending longitudinally thereof, and a casing enclosing the barrel and joining the fin on opposite sides thereof, the casing having an inlet and an outlet for cooling medium, said barrel being provided with an inlet, and the fin having a plurality of spaced passages communicating with the bore of the barrel and opening through the edge of the fin remote from the barrel.

5. A torch tip comprising a barrel having a bore, a fin projecting from the barrel and extending longitudinally thereof, and a casing enclosing the barrel and joining the fin on each side of the barrel between the barrel and the remote edge of the fin, all of said parts being formed integral, the casing having inlet and outlet connections and the barrel having a bore provided with an inlet and communicating with a plurality of spaced passages extending through the fin.

6. A torch tip consisting of an elongated body having a main gas passage extending longitudinally thereof with a plurality of lateral outlets therealong, a passage for a cooling medium paralleling said main gas passage, and a cooling medium supply communicating with said chamber at one end of said body and an outlet for the cooling medium at the opposite end of the body.

7. A torch tip consisting of an elongated body having a main gas passage extending longitudinally thereof with a plurality of lateral outlets therealong, a gas supply connection communicating with main gas passage on the side opposite said outlets, a passage for cooling medium paralleling said main gas passage, and cooling medium supply and discharge pipes connected with the tip on the side opposite said outlets and independent of said gas supply connection.

8. A torch tip consisting of an elongated body having a main gas passage extending longitudinally thereof with a plurality of lateral outlets therealong, a passage for a cooling medium paralleling said main gas passage and arranged between the latter and the side walls of the tip, and cooling medium supply and discharge pipes connected with the ends of said passage for cooling medium on the side of the tip opposite said outlets.

9. A torch tip consisting of a body containing a longitudinal gas passage, laterals extending therefrom, a casing surrounding the body and forming therewith a chamber for a cooling medium enclosing opposite sides of said passage, and a supply connection on said casing having communication with said gas passage through a passage extending across said chamber.

10. In apparatus of the class described, a torch tip consisting of an elongated body having a shank projecting from one side thereof, said body having an opening extending longitudinally therein, a chamber for a cooling medium and means independent of said shank for conducting the cooling medium to and from said chamber, said shank having a fuel conducting passage therein communicating with said openings, and a plurality of discharge orifices arranged in the same plane and connected with said opening at different points therealong.

In testimony whereof I affix my signature.

FRANK L. SLIFE.